Figure 1:
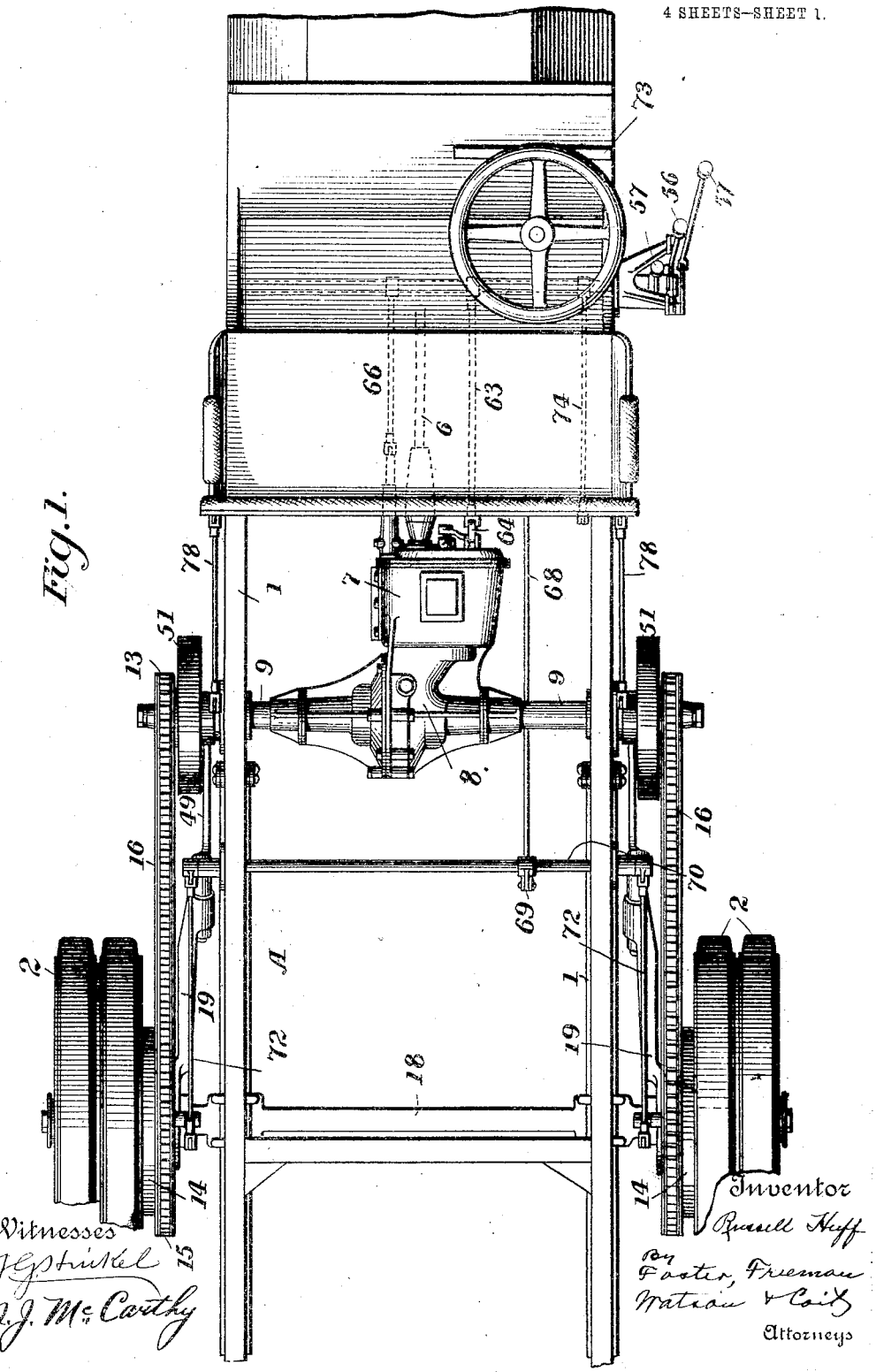

R. HUFF.
TRUCK BRAKE.
APPLICATION FILED MAY 7, 1908.

1,098,576.

Patented June 2, 1914.
4 SHEETS—SHEET 1.

Witnesses
J. G. Strickel
J. J. McCarthy

Inventor
Russell Huff
By Foster, Freeman, Watson & Coit
Attorneys

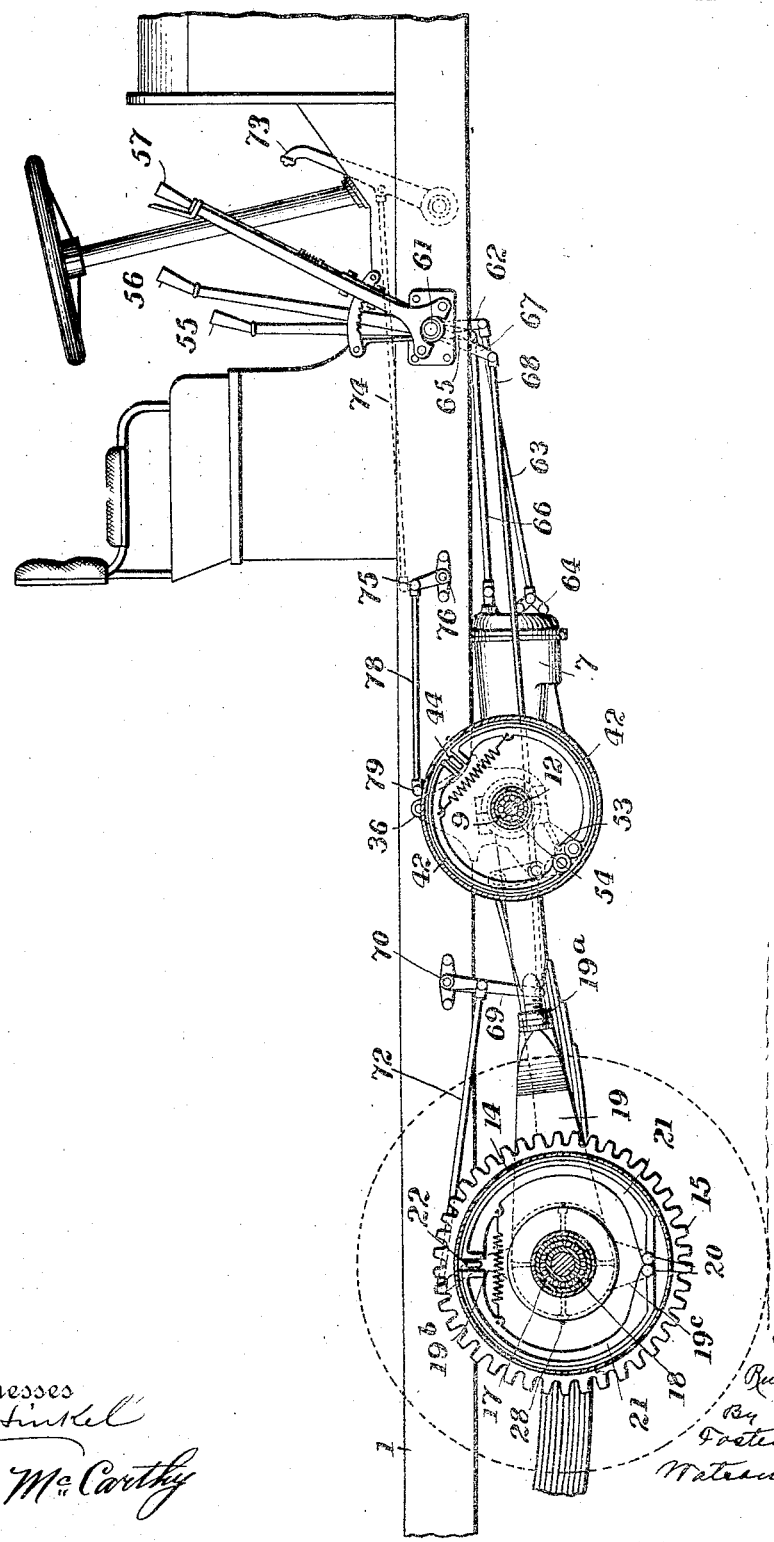

R. HUFF.
TRUCK BRAKE.
APPLICATION FILED MAY 7, 1908.
1,098,576.
Patented June 2, 1914.
4 SHEETS—SHEET 3.
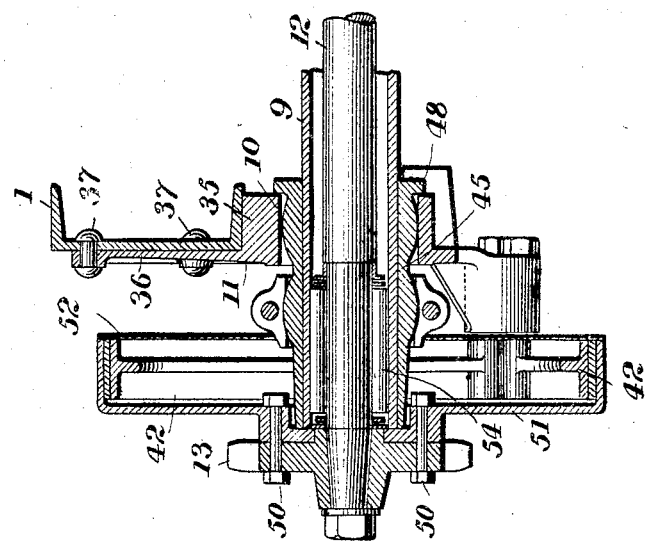
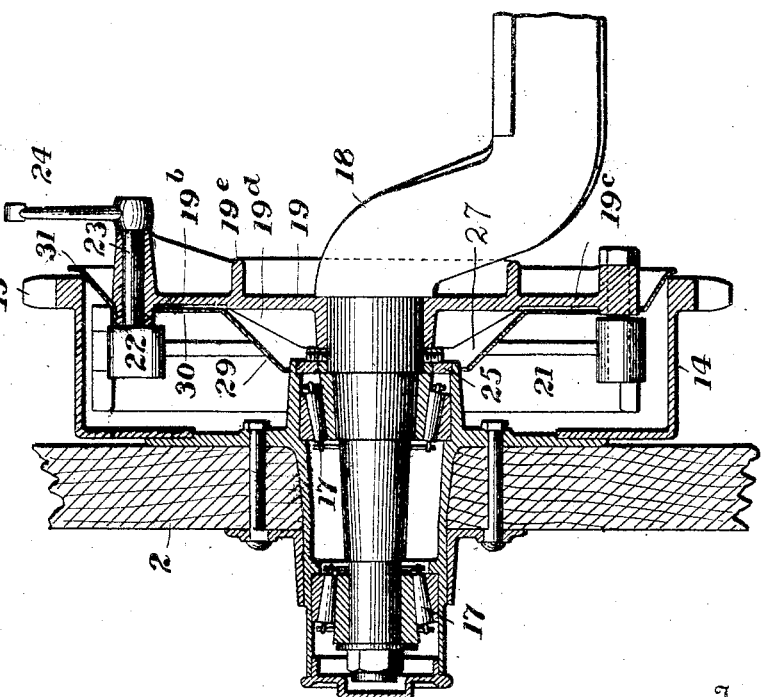
Witnesses
J. G. Stinkel
J. J. McCarthy
Inventor
Russell Huff
By
Foster, Freeman, Watson & Coit
Attorneys

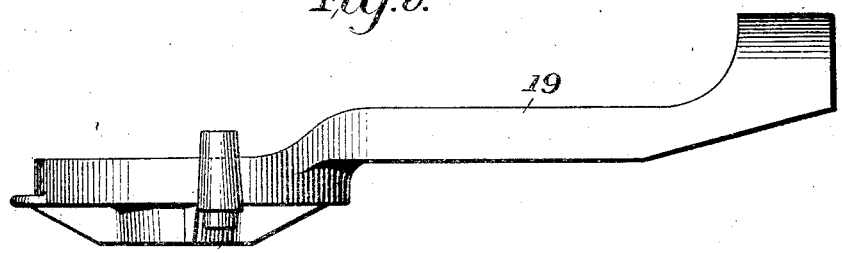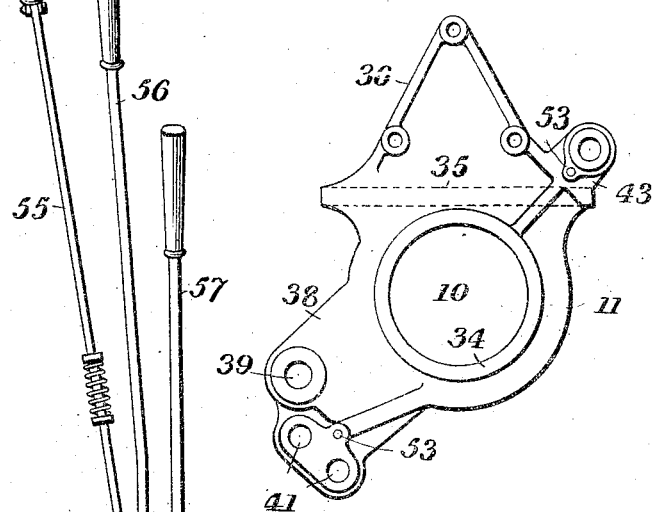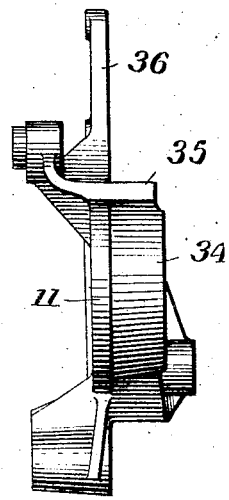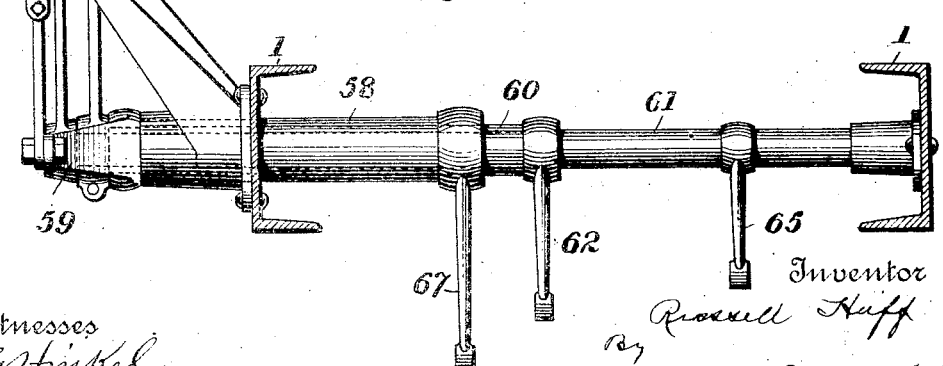

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

TRUCK-BRAKE.

1,098,576.  Specification of Letters Patent.  Patented June 2, 1914.

Application filed May 7, 1908. Serial No. 431,386.

*To all whom it may concern:*

Be it known that I, RUSSELL HUFF, a citizen of the United States, residing at Detroit, in the county of Wayne and State of Michigan, have invented certain new and useful Improvements in Truck-Brakes, of which the following is a specification.

My invention relates to motor vehicles, and consists in certain improvements in the construction and arrangement of the various parts, as fully set forth hereinafter and as illustrated in the accompanying drawing, in which:

Figure 1 is a plan of the frame and driving gear and connections of a motor vehicle embodying my improvements; Fig. 2 is a sectional elevation; Fig. 3 a transverse vertical section showing the parts adjacent to the jack-shaft at one end of the car; Fig. 4 is a transverse vertical section showing the parts adjacent to one of the drive wheels; Fig. 5 is a transverse view illustrating the arrangement of the operating levers and shafts; Figs. 6 and 7 are respective side and edge views of one of the supporting brackets; Fig. 8 is a top edge view of one of the radius arms.

My invention is shown applied to a truck having a main frame made up of the side angle bars 1 and similar end pieces, and supported by springs from the ordinary axles, carried by wheels 2. Supported from the side bars 1 by brackets 11 in advance of the rear wheels is the jack shaft 12 which is to be driven by an explosive engine (not shown) mounted on the forward part of the frame. The jack shaft has on its ends outside of the frame, sprocket wheels 13, which are operatively connected to the sprocket wheels 15 on the rear wheels by sprocket chains 16. According to my invention there are separate friction brakes on the jack shaft and the rear wheels, mounted as hereafter described and operated by novel means from the forward part of the truck where the operator sits.

As shown in Fig. 1, the drive shaft 6 which is adapted to be rotated by an engine on the forward part of the frame, enters the casing 7 which contains the usual change speed gears. Integrally formed with this casing is the casing 8 of the jack shaft differential, which last casing has the integral extensions 9 which form sleeves surrounding the divided jack shaft 12. The sleeves 9 (see Fig. 3) pass through cylindrical openings 10 in the brackets 11 secured to the side bars 1, and at the point where they pass through said openings they have bearing members 45 which are preferably shrunk on the ends of the sleeves. These bearing members have circumferential ridges curved in longitudinal section, closely fitting within the cylindrical openings 10, furnishing a flexible bearing which avoids any distortion of the casing by any warping or twisting of the frame. The bearing members 45 are further provided with flanges 48 which bear against the brackets 11 and prevent longitudinal displacement.

By reference to Fig. 3 it will be noticed that the jack shaft 12 which is supported by roller bearings 54 extends slightly beyond the end of sleeve 9 and bearing 45 and has secured to its ends the sprocket wheel 13. Secured on the inside of sprocket wheel 13 by bolts 50 is a brake drum 51 which surrounds the outer end of sleeve 9 and bearing 45. Expansible brake shoes 42 within this drum are carried by and secured to brackets 11.

The form of bracket 11 is clearly shown in Figs. 6 and 7, and it will be observed therefrom that in addition to the cylindrical portion 34 forming openings 10 the bracket has the horizontal flange or ledge 35 just above the openings 10 and the upright flange 36 at right angles to the cylindrical portion 34, and that thus the bracket is adapted to closely fit the bottom and side of the side bar 1, and to be secured thereto by bolts 37. The bracket has upon its lower part, but to one side, the arm 38 which is provided with openings 39 for the front shackle of the spring for the rear wheel, and also with the two openings 41 from which the two brake shoe members 42 are pivotally supported. On the upper part of the bracket, but on the side opposite the arm 38 is a boss 43 in which is journaled the shaft of the brake operating cam 44. It will be observed that the cam 44 is between the free ends of the brake shoes 42, and when turned it will separate those ends and force the shoes into frictional engagement with the drum 51. The diagonal arrangement of the supports for the brake shoe and operating cam on the bracket makes a very compact and strong structure and saves material.

A dust shield 52 is provided to close the inner open side of the brake drum 51, and this shield is in the shape of an annular disk held in place by screws 53 secured to bracket 11. The disk is of course provided with suitable openings for the bosses in which the brake shoes and operating cam are pivoted. The rear wheels 2 are mounted on the rear axle 18, suitable roller bearings 17 being provided between the parts. Bolted to the inner face of the spokes or hub of each rear wheel is a brake drum 14 which carries at its inner edge sprocket teeth 15 adapted to receive the drive chain 16. The rear wheels are therefore driven by the sprocket chains from the jack shaft.

The brake drum 14 is open on its inner side and the brake shoes 21 fit within it and are adapted to be expanded against its inner surface. The brake shoes are supported on the part marked 19 which extends forwardly and is connected by rod 49 with the jack shaft to form what are ordinarily termed radius rods. The parts 19 and 49 have adjustable connecting means 19ᵃ by which the length of the radius rod may be changed. The part 19 is supported at its rear end by the rear axle 18 which passes through it, as shown in Fig. 4. The rear end of the part 19 has the upwardly and downwardly extending arms 19ᵇ and 19ᶜ for supporting the brake mechanism, the pivot supports for brake shoes 21 being at 20 in the arm 19ᶜ. Between the upper free ends of the shoes is the operating cam 26 pivoted in arm 19ᵇ at 23 and connected to this cam is the arm 24 which is operated as hereafter described. Stiffening ribs or flanges 19ᵈ and 19ᵉ may be arranged on the outer and inner surfaces of the part 19. The forward end of the part 49 fits a semi-spherical bearing surface on the member 45 (see Fig. 3), thus forming a universal joint.

To exclude the dust from the interior of drum 14 and to prevent the oil or grease which gets past the packing 25 of the rear wheel hub from dropping onto the brake shoes and thus interfering with their operation there is provided a dust guard 27 which is attached to the radius rod 19 as by screws 28. This guard comprises a conical inner portion 29 arranged close to the wheel hub, an intermediate flat portion 30, and an outer conical portion 31, the outer edge of which passes out of the drum close to the sprocket wheel 15. The guard therefore prevents dust from entering the brake drum, and it will be apparent that any oil which passes the packing 25 will drip into the inner conical part of the shield and will after passing over the outer conical part 31, drop to the ground, or be picked up by the chain 16, and will thus lubricate the chain. The dust guard will of course be provided with openings to fit around the bosses of the arms 19ᵇ, 19ᶜ.

The brakes as well as the change speed and reverse gears are to be operated from points adjacent the driver's seat at the forward part of the vehicle, and I have devised improved means for mounting the operating levers. It will be seen by reference to Fig. 2 that the reverse gear is operated through arm 62, link 63 and toggle 64, the arm 62 being rigidly secured to the cross shaft 60 having a hand operated lever 57. The change speed gear is operated by an arm 65 and link 66, the arm being secured to cross shaft 61 having the operating hand lever 56. The brake on the rear wheel is operated by shaft 58, having the hand lever 55, and its motion is transmitted to the brake by means of the arm 67, link 68, arm 69 on the supplemental rock shaft 70, link 72, and arm 24 secured to the brake operating cam 22. The brake on the jack shaft is operated by the foot lever 73, link 74, arm 75 pivoted on rock shaft 76, link 78 and arm 79 of the brake operating cam 44.

It will be seen by reference to Fig. 5 that the brake lever 55, change speed lever 56 and reversing lever 57 are journaled concentrically on a transverse rock shaft. This is a desirable arrangement and it is also desirable that the brake lever be on the outside or the one farthest away from the frame. It is further desirable that the rock shaft or tube which the brake lever operates should be the strongest of the three rock shafts, for the reason that very little power is required to operate the change speed and reverse gearing, whereas considerable power is necessary in the operation of the brakes. With the three shafts concentrically nested as described, the connections for the operating levers would ordinarily be made in such a way that the innermost shaft would be the one connected with the outermost lever, and consequently the brake lever, if placed at the outside, would be connected to the weakest shaft. In order to avoid this and to still maintain the brake lever on the outside, the outside or strongest of the rock shafts 58 is provided on its outer end with a pair of curved arms 59 extending around and beyond the ends of the other two shafts 60 and 61. The lower end of the brake lever 55 is secured to the outer ends of these arms 59 and the brake lever is thus connected with the strongest outside rock shaft.

While I have shown in detail only one section of the divided jack shaft it is to be understood that the other section extending to the other side of the vehicle is similar. It is further to be understood that the supporting brackets, brakes, chains, radius rods and other connecting parts are the same on both sides of the vehicle and operate simultaneously.

Without limiting myself to the construction and arrangements shown, I claim:

1. The combination of jack-shaft sections, intermediate differential gear, a casing inclosing the gear and the shafts, the ends of the latter extending beyond the casing, a sprocket wheel and brake-drum carried by the projecting end of each shaft, and a radius bar recessed to receive and swinging about the end of the adjacent hollow arm of the casing.

2. The combination of jack shaft sections, intermediate differential gear, a casing inclosing the gear and the shafts, hollow bearing members for the latter extending beyond the casing and having annular transversely curved bearings, and radius bars recessed to fit said bearings, and a sprocket wheel and brake-drum carried by the projecting end of each shaft.

3. The combination with jack-shaft sections and intermediate differential gear, of a casing inclosing the gear and with arms inclosing the shaft except at the ends, and brake-drums secured to said ends and having side bearings against the ends of the said arms, and sprocket wheels carried by the ends of the shafts and connected to the adjacent brake drums.

4. The combination with the frame and jack-shaft of a motor vehicle, of a casing having hollow arms inclosing the jack-shaft, and sleeves on said arms each with two annular rounded bearings adapted respectively to openings in brackets attached to the frame and in radius bars.

5. The combination with the frame, rear axle, and jack shaft of a motor vehicle, and radius rods recessed to receive the axle, a casing for the jack shaft having direct connection with the radius rods, and brackets on the frame flexibly supporting said casing.

6. The combination with the frame, rear axle, and jack shaft of a motor vehicle, and radius rods recessed to receive the axle, a casing for the jack shaft having direct universal joint connection with the radius rods, and brackets on the frame flexibly supporting said casing.

7. The combination with the frame and jack-shaft of a motor vehicle, of brackets supporting said shaft, brake drums on the jack-shaft, brakes and operating means therefor supported by said brackets, brake members within each drum supported each at one end by the bracket, a cam between the free ends of the members, and a cam spindle supported to work in the bracket.

8. The combination with the frame and jack-shaft of a motor vehicle, of brackets connected with the frame and flexibly supporting said shaft and each provided with means independent of said shaft for connecting thereto the ends of supporting springs of the vehicle.

9. The combination with the frame and jack-shaft of a motor vehicle, of brackets connected with the frame and flexibly supporting said shaft and each provided with means independent of said shaft for connecting thereto eccentrically of said shaft the ends of supporting springs of the vehicle.

10. The combination with the frame and jack-shaft of a motor vehicle, of brackets connected with the frame and flexibly supporting said shaft and each provided with arms extending rearward and recessed to receive bolts for connecting thereto the ends of supporting springs of the vehicle.

11. The combination with the frame, of brackets connected thereto and supporting the jack-shaft thereof, each with a rearwardly extended arm recessed to receive bolts for connecting thereto the ends of brake members and the supporting spring of the vehicle.

12. The combination with the frame, of brackets connected thereto and supporting the jack-shaft thereof, each with a rearwardly extended arm recessed to receive bolts for connecting thereto the ends of brake members and of a supporting spring of the vehicle, and with a bearing for a brake operating spindle.

13. A bracket for motor vehicles having a web adapted to the side of the side bar of the vehicle, and a flange adapted to the bottom of said side bar, with a transverse tubular recess for bearings of the jack-shaft casing, and projecting arms recessed to receive bolts supporting brake levers and a spindle for operating the brake.

14. A bracket for motor vehicles having a web adapted to the side of the side bar of the vehicle, and a flange adapted to the bottom of said side bar, with a transverse tubular recess for bearings of the jack-shaft casing, and diagonally projecting arms recessed to receive bolts supporting brake levers and a spindle for operating the brake.

15. The combination with the frame, rear axle, drive wheels and sectional jack-shaft of a vehicle, of brake drums on the axle and shaft sections, and radius bars recessed to receive the rear axle of the vehicle also recessed to receive the jack-shaft at points adjacent to its brake drums.

16. The combination with the frame, rear axle, drive wheels and sectional jack-shaft of a vehicle, of brake drums on the axle and shaft sections, and radius bars recessed to receive the rear axle of the vehicle also recessed to receive the jack-shaft sections at points adjacent to its brake drums, and brake operating appliances carried by the radius bar adjacent to the drum of each drive-wheel.

17. The combination with the frame, rear axle drive wheels and jack shaft of a motor vehicle, of a casing having hollow arms inclosing the jack-shaft and radius bars each recessed to receive the rear axle and one of the said hollow arms at a point outside the vehicle frame.

18. The combination with the frame, rear axle drive wheels and jack-shaft of a motor vehicle, of a casing having hollow arms inclosing the jack shaft and radius bars each recessed to receive the rear axle and having a rocking bearing on the hollow arms at a point outside the said frame.

19. The combination with the frame of a motor vehicle and recessed brackets thereon, of a jack-shaft, a casing provided with hollow arms inclosing said shaft, and rounded bearings on said arms fitted to work in recesses on said brackets and other rounded bearings on said arms adapted to recesses in the forward ends of radius bars.

20. The combination with the frame of a motor vehicle and recessed brackets thereon, of a jack-shaft, a casing provided with hollow arms inclosing said shaft, and rounded bearings on said arms fitted to work in recesses on said brackets and other rounded bearings on said arms outside of said frame adapted to recesses in the forward ends of radius bars.

21. The combination with the frame, rear axle and drive wheels, jack shaft and casing therefor, brackets on the frame flexibly supporting said casing, and sprockets on the wheels and jack shaft ends respectively, of radius rods recessed at both ends to receive respectively the rear axle and the jack shaft casing at points adjacent said sprockets.

In testimony whereof I affix my signature in presence of two witnesses.

RUSSELL HUFF

Witnesses:
 HOWARD HARKNESS,
 CLARA I. DALE.